C. ERICSON.
CHURN.
APPLICATION FILED JULY 17, 1913.
1,129,798.
Patented Feb. 23, 1915.
2 SHEETS—SHEET 1.
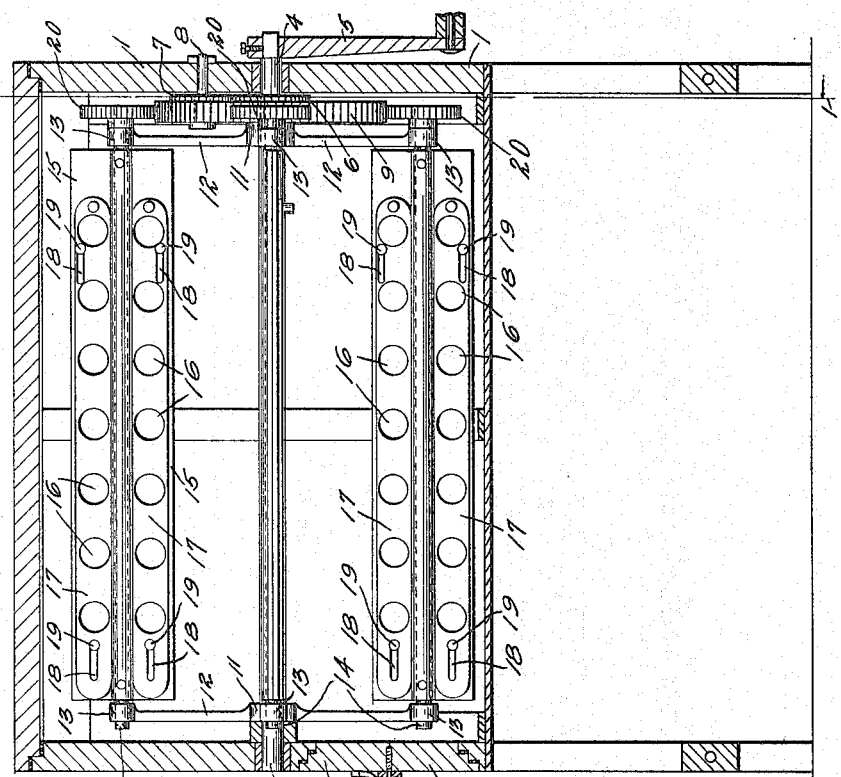
WITNESSES
Paul A. Viersen.
Leona V. Daughty.
INVENTOR
C. Ericson
H. Darden
BY
ATTY.

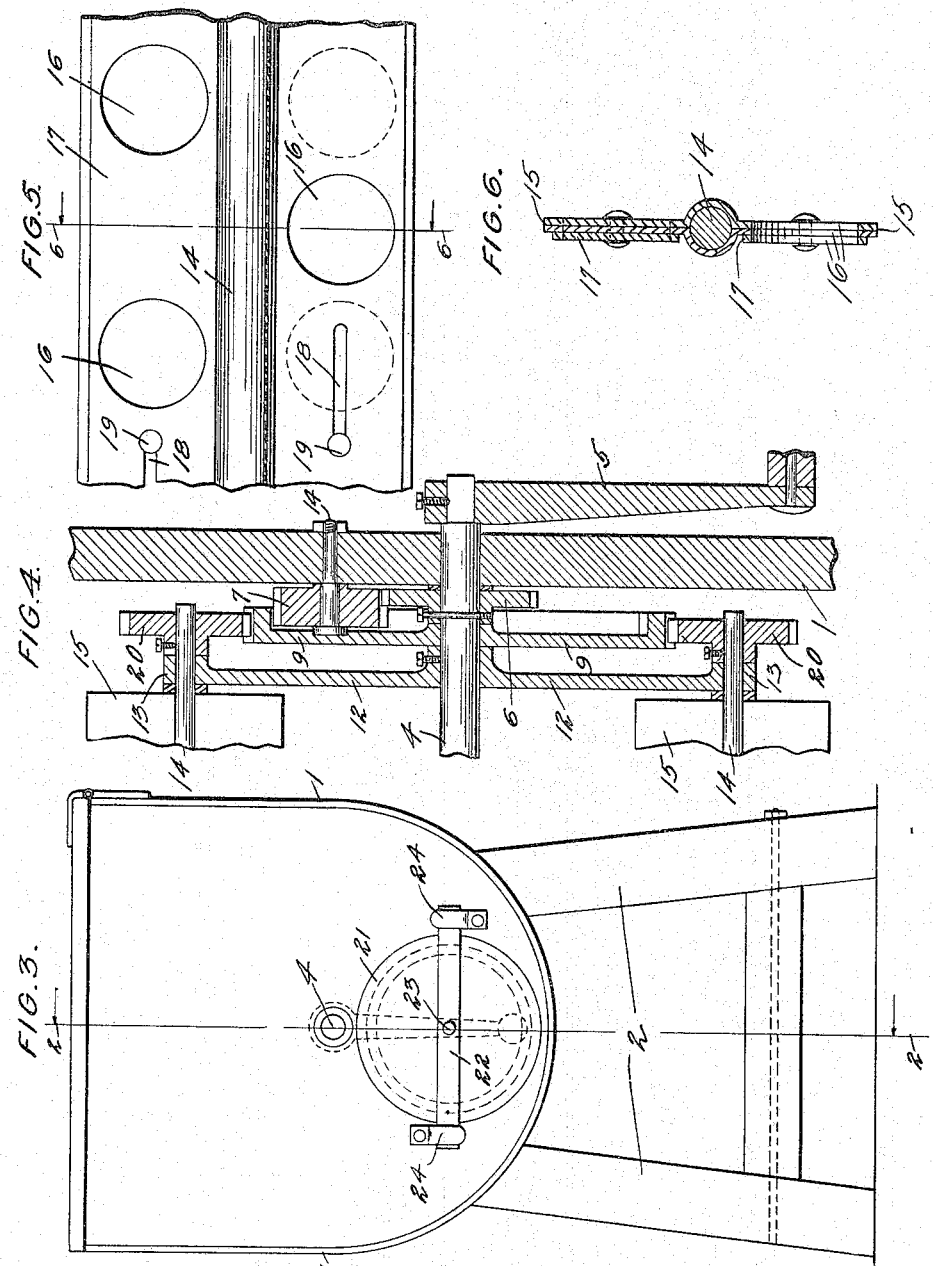

UNITED STATES PATENT OFFICE.

CAROLINE ERICSON, OF GREAT FALLS, MONTANA.

CHURN.

1,129,798. Specification of Letters Patent. Patented Feb. 23, 1915.

Application filed July 17, 1913. Serial No. 779,466.

*To all whom it may concern:*

Be it known that I, CAROLINE ERICSON, a citizen of the United States, residing at Great Falls, in the county of Cascade and State of Montana, have invented certain new and useful Improvements in Churns, of which the following is a specification.

This invention relates to improvements in churns and its object is to provide a churn having a plurality of dashers adapted to rotate upon their axes in a direction reverse to the direction of their rotation about a central drive shaft.

Means for facilitating the collection of butter on the dashers as the butter is formed are also provided.

With the foregoing and other objects in view the invention consists in the combination and arrangement of parts to be hereinafter fully described in the following specification, pointed out in the claim and illustrated in the accompanying drawings which form a part of said specification and in which—

Figure 1 is a sectional end elevation. Fig. 2 is a sectional side elevation. Fig. 3 is an end elevation. Fig. 4 is a sectional detail, enlarged, of the gearing. Fig. 5 is an enlarged detail of a portion of one of the dashers. Fig. 6 is a section taken on line 6—6 of Fig. 5.

Like reference characters indicate corresponding parts throughout the several views.

1 is the churn body disposed upon supports 2 and provided with a hinged cover 3. Through the body of the churn the main shaft 4 extends longitudinally and the same is provided with the handle 5 by which it is rotated. The gear 6 made fast to the shaft 4 meshes with the gear 7 which is disposed upon the shaft 8 journaled in the churn body and said gear 7, rotating in a direction opposite to the gear 6 and shaft 4, is disposed inside of and meshes with the gear 9 rotating it in a direction opposite to the direction of the shaft 4. Upon either end of the shaft 4 within the churn body a hub 11 is disposed and provided with radial arms 12 each of which terminates in a bearing 13 for one end of a transverse shaft 14 upon which a wing 15 is carried and each of said wings is formed with a plurality of apertures 16 and over said wing a slide 17 formed with apertures normally in alinement with the apertures in the wing is provided. By means of elongated slots 18 in said slides through which pins 19 from the wings extend the said slides may be moved with relation to the wings until the apertures in said wings are closed. Upon one end of each shaft 14 a gear 20 is carried that meshes with the gear 9 herein previously described, the rotation of said gears 20 and shaft 14 being in a direction reverse to the direction of the gear 9.

The body of the churn is provided with a removable end door 21 normally retained in position by means of a spring 22 secured thereto as at 23, the ends of said spring resting removably under the free ends of angular lugs 24, 24 secured to the churn body.

Operation: Rotation of the handle 5 rotates the shaft 4 and the gear 6 and through the medium of the gear 7 inside the large gear 9 that gear is driven in the direction of the gear 6. The gears 20 in mesh with the gear 9 are rotated by it in a reverse direction to its rotation thus rotating the wings 15 upon their shafts 14 in a direction opposite to the direction of the gear 9; the hub 11 being fast to the shaft 4 is rotated in the same direction as that shaft carrying the wings 15 about that shaft in a direction reverse to that in which they are rotating upon their individual shafts. In this manner the contents of the churn are agitated in a most thorough manner and butter will be produced from milk in the minimum time. When the butter has begun to form the apertures in the wings 15 may be closed by means of the slides 17 permitting the butter to collect upon said wings from which it may be readily and conveniently removed.

What is claimed is:—

A device of the type described, including a dasher comprising a shaft equipped with radial arms, and apertured blades carried by said arms, said blades being provided with correspondingly apertured supplemental blade-like members, and means effecting the longitudinal or endwise slidable movement of said supplemental blades upon the primary blades, such movement of said supplemental blades being restricted within a corresponding area of said primary blades.

In testimony that I claim the foregoing as my own I have hereto affixed my signature in the presence of two subscribing witnesses.

CAROLINE ERICSON.

Witnesses:
A. J. SCHMIDT,
F. GERTRUDE HARBED.

Copies of this patent may be obtained for five cents each, by addressing the "Commissioner of Patents, Washington, D. C."